June 5, 1923.

W. H. RECTOR

BATTERY CASE AND SWITCH

Filed Jan. 17, 1923

1,457,671

Inventor
William Hurley Rector,
By Franks Ackerman
Attorney

Patented June 5, 1923.

1,457,671

UNITED STATES PATENT OFFICE.

WILLIAM HURLEY RECTOR, OF WILLIAMSON, WEST VIRGINIA.

BATTERY CASE AND SWITCH.

Application filed January 17, 1923. Serial No. 613,284.

*To all whom it may concern:*

Be it known that I, WILLIAM HURLEY RECTOR, a citizen of the United States of America, and resident of Williamson, in the county of Mingo and State of West Virginia, have invented certain new and useful Improvements in Battery Cases and Switches, of which the following is a specification.

This invention relates to battery holders and switches, and the invention is primarily intended for use by miners and other operators who wish to periodically energize conductors, as is done where blasting charges are to be detonated.

The invention has for an object, the provision of a novel battery case or shield, and novel means associated with it for effecting electrical contacts, whereby the current from the battery may be used without the liability of creating sparks which will prove damaging in mines or the like.

It is well known that the ordinary batteries quickly become impaired and the fact that their terminals are exposed proves dangerous, and it is an object of this invention to protect the terminals of batteries and to provide means whereby the energy of the battery may be used in the manner stated.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
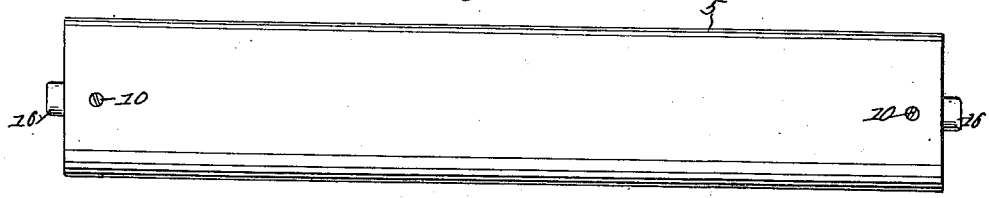
Figure 1 illustrates a battery case embodying the invention.
Figure 2:
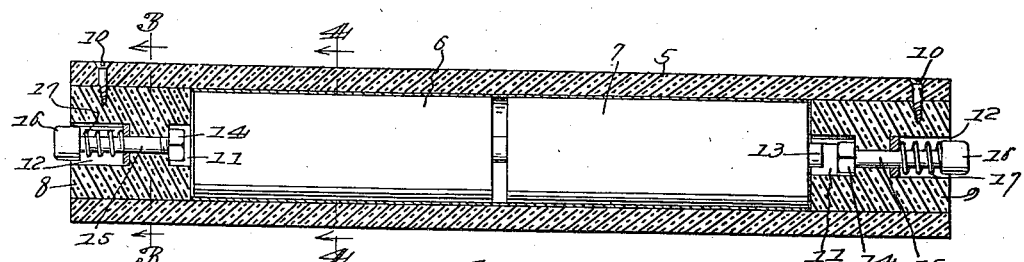
Figure 2 illustrates a sectional view thereof, showing the battery in elevation.
Figure 3:
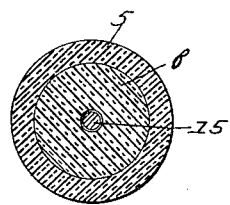
Figure 3 illustrates a sectional view on the line corresponding with the line 3—3 of Fig. 2.
Figure 4:
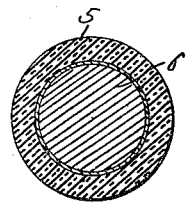
Figure 4 illustrates a sectional view of the device on the line corresponding with the line 4—4 of Fig. 2.

In these drawings, 5 denotes a casing which is preferably cylindrical, although the inventor does not wish to be limited with respect to the cross sectional configuration thereof. The casing should be of such capacity as to hold appropriate battery elements such as 6 and 7, and the ends of the cylindrical member are provided with plugs or heads 8 and 9. The casing and the heads are preferably constructed of some non-conductive material, and the heads may be held in place in any appropriate manner, as by screws 10. Each head is provided with a switch or terminal contact adapted to engage the terminals of the battery, and preferably, these switch elements are of identical construction so that the heads may be interchangeable, if desired. Each plug or head is preferably of an external contour conforming to the internal contour of the casing, and each of the said heads has recesses 11 and 12 in its inner and outer ends, the inner recess of which constitutes a clearance either for the terminal 13 of the battery or for the enlarged head 14 of the switch element which is adapted to engage said terminal, or the inner recess may be of such capacity as to receive both the battery terminal and the head of the switch element.

The switch element has a shank 15 on which the head 14 is carried, and the shank terminates preferably in an enlargement 16 which may be pressed by an operator to force the head 14 into engagement with the terminal of the battery. A spring 17 encircles a portion of the shank within the recess 12 and it bears against the shoulder of the enlargement 16 and is operative to hold the switch element normally outward, disengaged from the terminal of the battery.

The heads, as has been stated, are of identical construction and are interchangeable, and therefore, a description of one of the elements will suffice as an understanding of the construction of the switch elements on the two heads, by one skilled in the art.

When conductors are to be energized for the purpose of establishing a circuit to a sparking device or detonator, the operator may place the terminals of the conductors against the projecting portions of the switches, and then by pressing the switches inwardly until they engage the battery or the terminals thereof, the circuit will be established and, of course, current will be delivered. When pressure is removed from the switch elements, the springs will operate to force them out of engagement with the battery, and there will be no further danger of sparks from the battery, since the terminals of the battery are far apart and the circuit could only be established when the device is manipulated to accomplish that result.

As the heads or the plugs are of identical construction, as stated, the reference numerals have been applied to them alike.

I claim:

In a battery case and switch, a tubular battery enclosing device, heads applied to the ends of the tube, each of said heads comprising a plug having recesses in its inner and outer ends, a shank slidable through the plug and having a head on its inner end operative in the recess in the inner end of the said plug for engaging the terminal of the battery and for limiting the outward movement of the shank, and means for normally holding the shank projected outwardly.

WILLIAM HURLEY RECTOR.